US000001912H

United States Statutory Invention Registration [19]

[11] Reg. Number: H1,912

[45] Published: Nov. 7, 2000

Arndt

[54] REMOTELY CONTROLLED BRAKE SYSTEM

[75] Inventor: Robin S. Arndt, Joliet, Ill.

[73] Assignee: Caterpillar Inc., Peoria, Ill.

[21] Appl. No.: 09/212,893

[22] Filed: Dec. 15, 1998

[51] Int. Cl.[7] ..... B60T 13/74

[52] U.S. Cl. ..... 303/3

[56] References Cited

U.S. PATENT DOCUMENTS

| | | | |
|---|---|---|---|
| 3,827,242 | 8/1974 | Belart | 60/552 |
| 3,827,759 | 8/1974 | Belart | 303/21 F |
| 3,918,765 | 11/1975 | Hayashida | 303/6 R |
| 4,335,867 | 6/1982 | Bihlmaier | 251/28 |
| 4,477,125 | 10/1984 | Belart et al. | 303/116 |
| 4,783,128 | 11/1988 | Resch | 303/114 |

*Primary Examiner*—Harold J. Tudor
*Attorney, Agent, or Firm*—J. W. Burrows

[57] ABSTRACT

A remotely controlled brake system is provided to permit braking control of a machine from a remote location while still permitting an operator located on the machine to control the braking function of the machine. Remote control is accomplished by providing a source of pressurized fluid on the machine with an electrically controlled proportional valve arrangement that is responsive to a remote signal to direct pressurized fluid to the brakes of the machine in parallel with the pressure control being directed to the machine brakes by an operator input mechanism.

14 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOTELY CONTROLLED BRAKE SYSTEM

TECHNICAL FIELD

This invention relates generally to the control of a brake system for a machine and more particularly to a remotely controlled brake system operating in parallel with an on-board operator actuated brake system.

BACKGROUND ART

There are many normal on-board operator actuated brake systems. Many of these include various types of anti-skid brake systems with power assistance. Others include air over hydraulic controls with split controls between operation of the front brakes and the rear brakes. Other brake systems are totally hydraulically actuated and hydraulically controlled. At times it is desirable to provide a braking system on a machine that is actuated by an operator located on the machine while at the same time, with or without an operator, allowing the brakes to be controlled from a position remote from the machine. Instead of providing a totally separate braking system, it is desirable to use the same braking mechanism but use a different control arrangement that can be controlled from a remote location.

The present invention is directly to overcoming one or more of the problems as set forth above.

DISCLOSURE OF THE INVENTION

In one aspect of the present invention, a remotely controlled brake system is provided and adapted to control the brakes of a machine and operate in parallel with an onboard brake control. The brakes of the machine includes fluid pressure controlled brakes with an operator controlled pressure input arrangement operative to direct a pressurized fluid volume to the fluid pressure controlled brakes for actuation thereof. The remotely controlled brake system includes a source of pressurized fluid, an electrically controlled proportional fluid control valve arrangement disposed between the source of pressurized fluid and a connection with the pressurized fluid volume from the operator controlled pressure input arrangement, and an electronic controller operative to receive a signal from a remote location and deliver an electrical signal to the electrically controlled proportional fluid control valve arrangement.

BEST MODE FOR CARRYING OUT THE INVENTION

Figure 1:
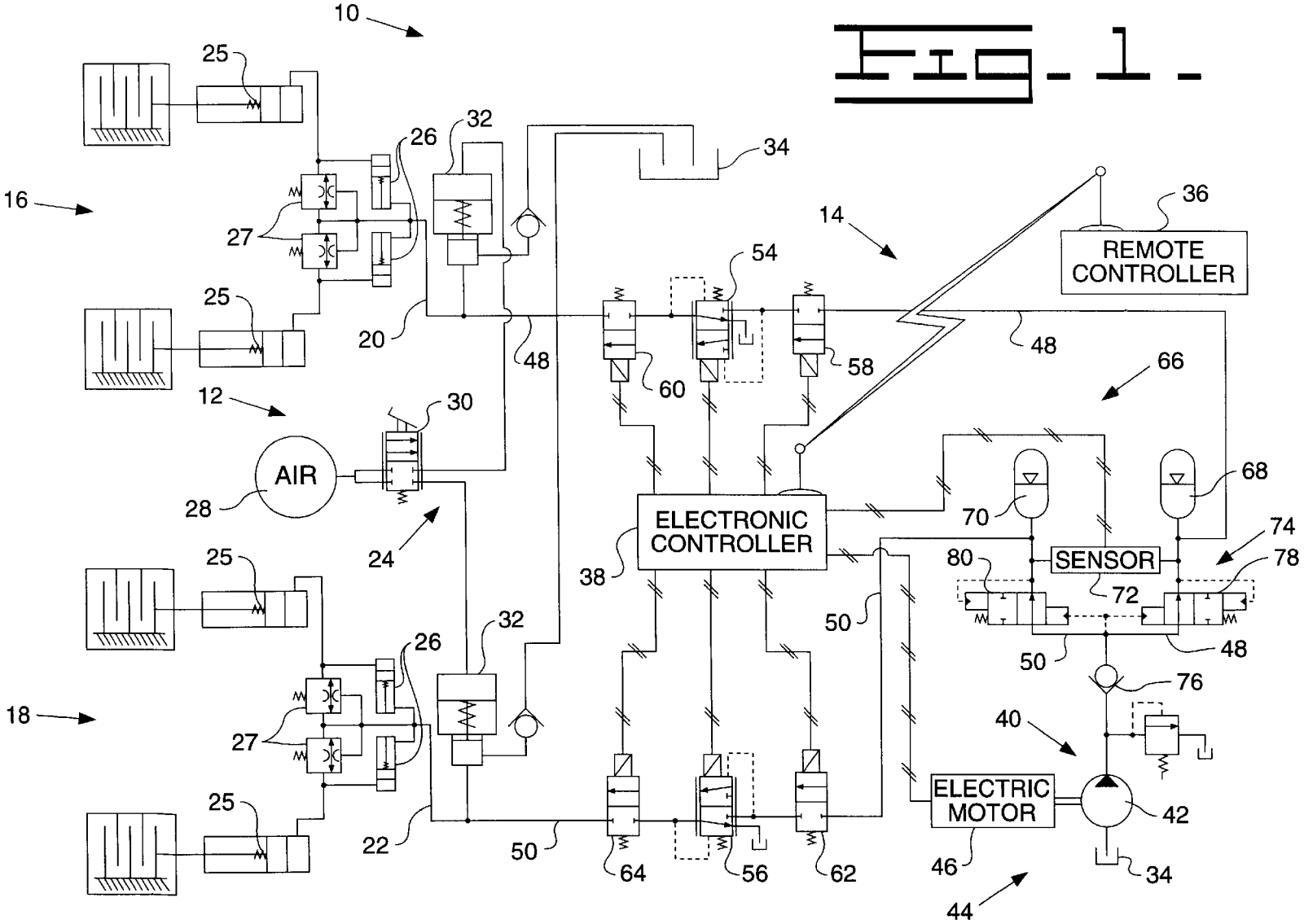
FIG. 1 is a partial schematic and a partial diagrammatic representation of a machine's brake control system incorporating the subject invention.

Referring to FIG. 1 of the drawings, a machine's brake control arrangement 10 is illustrated. The brake control arrangement 10 includes an on-board brake control 12 and a remotely controlled system 14. The machine (not shown) includes first and second sets of brakes 16,18 that may either be mechanical dry-brakes or fluid wet-brakes. The brakes of the machine of FIG. 1 are fluid wet-brakes. The first set of brakes 16 may, for example, be rear brakes and the second set of brakes 18 may be front brakes. The first and second sets of brakes 16,18 are pressure applied in response to receipt through conduits 20,22 of respective first and second pressurized volumes of fluid from an operator controlled pressure input arrangement 24 and spring released by respective springs 25 in a conventional manner. In the subject brakes, the pressurized fluid is directed through known slack adjusters 26 and flow equalizers 27. It is recognized that the first and second sets of brakes 16,18 could be spring applied and pressure released without departing from the essence of the subject invention.

The operator controlled pressure input arrangement 24 includes a known air over hydraulic system. An air supply 28 provides pressurized air to an operator controlled master cylinder 30 which upon the operator's input proportionally directs pressurized air to respective power boosters 32. The power boosters 32 receive pressurized air and in a well known manner coverts the force therefrom into hydraulic force by compressing hydraulic oil received from a reservoir 34. The hydraulic oil being delivered from each of the power boosters 32 represents the first and second pressurized fluid volumes being directed to the respective first and second sets of brakes 16,18 through the respective conduits 20,22.

The remotely controlled brake system 14 includes a remote controller 36 located at a distance from the machine and operative to direct a control signal to an electronic controller 38 mounted on the machine.

The remotely controlled brake system 14 further includes a source of pressurized fluid 40, such as a hydraulic pump 42, that is selectively driven by a power source 44, such as an electric motor 46. It is recognized that the pump 42 could be continuously driven by the electric motor 44. A first fluid conduit 48 communicates the source of pressurized fluid 40 with the first pressurized fluid volume in the conduit 20 and subsequently to the first set of brakes 16 for actuation thereof. A second fluid conduit 50 communicates the source of pressurized fluid 40 with the second pressurized fluid volume in the conduit 22 and subsequently to the second set of brakes 18 for actuation thereof.

An electrically controlled proportional control valve arrangement 52 is disposed between the source of pressurized fluid 40 and the first and second sets of brakes 16,18 and operative to control engagement of the first and second sets of brakes 16,18 by controlling the flow of pressurized fluid thereto. The electrically controlled proportional control valve arrangement 52 includes first and second electrically controlled proportional two position valves 54,56. The first electrically controlled proportional two position valve 54 is disposed in the first fluid conduit 48 and the second electrically controlled proportional two position valve 56 is disposed in the second conduit 50.

Each of the first and second electrically controlled proportional two position valves 54,56 is movable from a first position at which fluid flow from the source of pressurized fluid 40 is blocked from the connection with the respective first/second pressurized fluid volume in the respective conduit 20/22 towards a second position at which fluid from the source of pressurized fluid 40 is in open communication with the respective conduit 20/22. The first and second electrically controlled proportional two position valves 54,56 are each spring biased to their first positions and movable towards their second positions in response to receipt of an electrical signal from the electronic controller 38.

A first electrically controlled poppet valve 58 is disposed in the conduit 48 between the source of pressurized fluid 40 and the first electrically controlled proportional two position valve 54. A second electrically controlled poppet valve 60 is disposed in the conduit 48 between the first electrically controlled proportional two position valve 54 and the connection with the first pressurized fluid volume in conduit 20. Likewise, a third electrically controlled poppet valve 62 is disposed in the conduit 50 between the source of pressurized fluid 40 and the second electrically controlled proportional two position valve 56 and a fourth electrically controlled poppet valve 64 is disposed in the conduit 50 between the second electrically controlled proportional two position valve 56 and the connection with the second pressurized fluid volume in conduit 22. Each of the first, second, third, and fourth electrically controlled poppet valves 58,60,62,64 is movable from a spring biased flow blocking position that checks off the flow from the source of pressurized fluid 40 towards the respective first and second sets of brakes 16,18 and movable to a second position that permits free flow therethrough. Each of the poppet valves 58,60,62,64 is movable to the second position in response to receipt of an electrical signal from the electronic controller 38.

An accumulator arrangement 66 is connected to the source of pressurized fluid 40 and operative to store pressurized fluid in a conventional manner. The accumulator arrangement 66 includes a first accumulator 68 disposed in the first fluid conduit 48 upstream of the first electrically controlled poppet valve 58 and a second accumulator 70 disposed in the second fluid conduit 50 upstream of the third electrically controlled poppet valve 62.

A pressure sensor arrangement 72 is connected to the accumulator arrangement 66 and operative to direct an electrical signal to the electronic controller 38 that is representative of the pressure of the fluid in the accumulator arrangement 66. The sensor arrangement 72 is connected to the first and second fluid conduits 48,50 at a location generally adjacent the first and second accumulators 68,70.

An accumulator charging arrangement 74 is disposed between the source of pressurized fluid 40 and the accumulator arrangement 66. A one-way check valve 76 is disposed between the source of pressurized fluid 40 and the accumulator charging arrangement 74 and operative to permit fluid flow from the source of pressurized fluid 40 toward the accumulator charging arrangement 74 and block reverse flow therethrough. The accumulator charging arrangement 74 includes a first accumulator charging valve 78 disposed in the conduit 48 upstream of the first accumulator 68 and a second accumulator charging valve 80 disposed in the conduit 50 upstream of the second accumulator 70. Each of the first and second accumulator charging valves 78,80 is operative to controllably direct pressurized fluid from the source of pressurized fluid 40 to the first and second accumulators 68,70.

Figure 2:
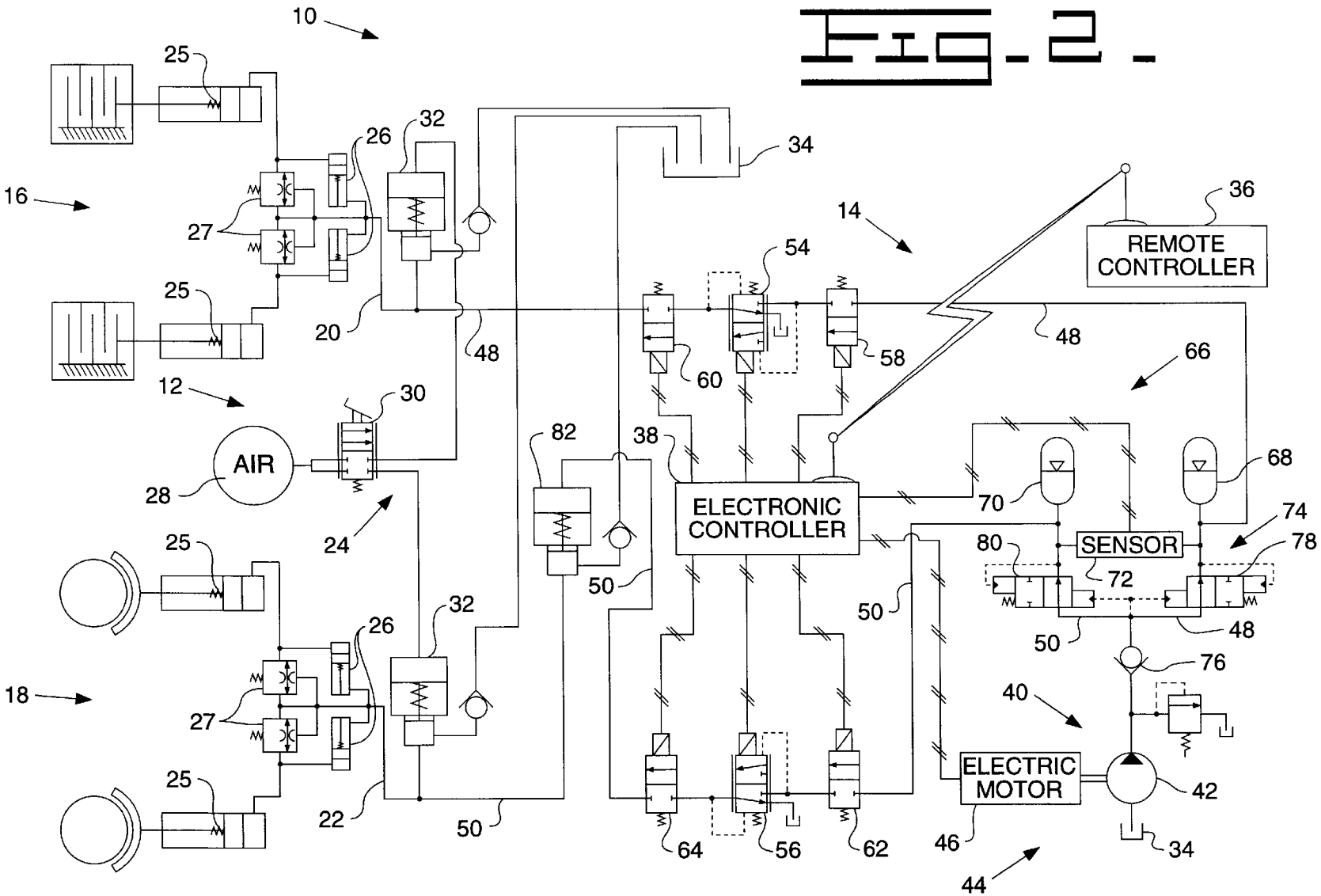
FIG. 2 is a partial schematic and a partial diagrammatic representation of another embodiment of the subject invention.

Referring to FIG. 2, another embodiment of the remotely controlled brake system 14 of the machine's brake system 10 is illustrated. Like elements have like element numbers. The major difference between the remotely controlled brake system 14 of FIG. 1 and that of FIG. 2 is that a pressure intensifier 82 is disposed in the conduit 50 between the fourth electrically controlled poppet valve 64 and the second pressurized fluid volume in the conduit 22. Additionally, the second set of brakes 18 are mechanically applied dry-brakes. The pressure intensifier 82 is operative to increase the pressure of the fluid in the conduit 50 downstream thereof towards the second set of brakes 18 relative to the pressure upstream thereof from the source of pressurized fluid 40.

INDUSTRIAL APPLICABILITY

In the operation of the brake control arrangement 10 of the machine with an operator onboard, the operator engages the master cylinder 30 to direct a controlled volume of pressurized air to the respective power boosters 32. The force generated by the pressurized air at the power boosters 32 is converted to hydraulic energy to direct the respective first and second pressurized fluid volumes to the first and second sets of brakes 16,18 through the conduits 20,22 in a conventional manner.

When it is desirable to control braking of the machine remotely, a braking input command is made at the remote controller 36. A signal representative of the input command is delivered from the remote controller 36 to the electronic controller 38 on the machine. The electronic controller 38 processes the signal and delivers respective electrical signals to the first and second electrically controlled proportional two position valves 54,56 moving them towards their second positions as dictated by the signal from the remote controller 36. Simultaneously, electrical signals are delivered to the first, second, third, and fourth electrically controlled poppet valves 58,60,62,64 moving them to their second, open, flow passing position. The controlled fluid from the source of pressurized fluid 40 is delivered to the first and second sets of brakes 16,18 through the respective conduits 20,22 thus proportionally applying the first and second sets of brakes 16,18. Changes in the signal from the remote controller 36 results in proportional changes to the braking force being applied to the first and second brakes 16,18.

The accumulator arrangement 66 stores pressurized fluid so that the first and second sets of brakes 16,18 can be actuated several times without needing any fluid from the source of pressurized fluid 40. Consequently, in the event of a pump failure, the braking system can still be controlled remotely. Likewise, with the use of the pressure sensor arrangement 72, the source of pressurized fluid 40 may be disengaged by stopping the power source 44 when the pressure level at the accumulator arrangement 66 is at or above a predetermined level and reengage the power source 44 once the pressure at the accumulator arrangement 66 drops below a second predetermined level. By engaging and disengaging the power source 44, there is an energy savings. This energy savings is attributed to the fact that very little, if any, fluid from the source of pressurized fluid 40 is being directed at a high pressure across the relief valve as is normally the case.

The operation of the remotely controlled brake system 14 of FIG. 2 is the same as that of FIG. 1. As noted above, the difference is that the second set of brakes 18 is mechanical dry-brakes and a pressure intensifier 82 is disposed in the second fluid conduit 50 in order to increase the pressure of the fluid to the second set of brakes 18 to obtain the desired actuation force thereon.

Other aspects, objects and advantages of this invention can be obtained from the study of the drawings, the disclosure and the appended claims.

What is claimed is:

1. A remotely controlled brake system adapted to control the brakes of a machine and operate in parallel with an onboard brake control, the brakes of the machine including fluid pressure controlled brakes with an operator controlled pressure input arrangement operative to direct a pressurized fluid volume to the fluid pressure controlled brakes, the remotely controlled brake system, comprising:

a source of pressurized fluid;

an electrically controlled proportional fluid control valve arrangement disposed between the source of pressurized fluid and a connection with the pressurized fluid volume from the operator controlled pressure input arrangement;

an electronic controller operative to receive a signal from a remote location and deliver an electrical signal to the electrically controlled proportional fluid control valve arrangement.

2. The remotely controlled brake system of claim 1 wherein the electrically controlled proportional fluid control valve arrangement includes an electrically controlled proportional two position valve movable from a first position at which fluid flow from the source of pressurized fluid is blocked from the connection with the pressurized fluid volume from the operator controlled pressure input arrangement towards a second position at which fluid flow from the source of pressurized fluid is open to the connection with the pressurized fluid volume from the operator controlled pressure input arrangement.

3. The remotely controlled brake system of claim 2 including an electrically controlled poppet valve disposed between the source of pressurized fluid and the electrically controlled two position valve, the electrically controlled poppet valve is movable from a flow blocking position to a position to permit flow from the source of pressurized fluid to the electrically controlled proportional two position valve.

4. The remotely controlled brake system of claim 3 including a second electrically controlled poppet valve disposed between the electrically controlled two position valve and the connection with the pressurized fluid volume from the operator controlled pressure input arrangement, the second electrically controlled poppet valve is movable from a flow blocking position to a position to permit flow from the electrically controlled proportional two position valve to the connection with the pressurized fluid volume from the operator controlled pressure input arrangement.

5. The remotely controlled brake system of claim 4 including an accumulator arrangement disposed between the source of pressurized fluid and the first electrically controlled poppet valves.

6. The remotely controlled brake system of claim 5 including a power source driving the source of pressurized fluid, a pressure sensor arrangement connected to the accumulator arrangement and operative to direct an electrical signal to the electronic controller representative of the pressure level of the fluid from the accumulator arrangement, and an accumulator charging arrangement disposed between the source of pressurized fluid and the accumulator arrangement, the power source driving the source of pressurized fluid is engaged and disengaged in response to the sensed pressure signal.

7. The remotely controlled brake system of claim 2 including a pressure intensifier disposed between the electrically controlled proportional fluid control valve arrangement and the connection with the pressurized fluid volume from the operator controlled pressure input arrangement.

8. The remotely controlled brake system of claim 2 wherein the brakes of the machine includes a second set of pressure controlled brakes and the operator controlled pressure input arrangement is operative to direct a second pressurized fluid volume to the second set of pressure controlled brakes and the electrically controlled proportional fluid control valve arrangement includes a second electrically controlled proportional two position valve disposed between the source of pressurized fluid and a connection with the second pressurized fluid volume, the second electrically controlled proportional two position valve is movable from a first position at which fluid flow from the source of second pressurized fluid is blocked from the connection with the pressurized fluid volume from the operator controlled pressure input arrangement towards a second position at which fluid flow from the source of second pressurized fluid is open to the connection with the pressurized fluid volume from the operator controlled pressure input arrangement.

9. The remotely controlled brake system of claim 8 wherein the accumulator arrangement includes a first accumulator disposed between the source of pressurized fluid and the first electrically controlled two position valve and a second accumulator disposed between the source of pressurized fluid and the second electrically controlled two position valve.

10. The remotely controlled brake system of claim 9 including a third electrically controlled poppet valve disposed between the second accumulator and the second electrically controlled two position valve.

11. The remotely controlled brake system of claim 10 including a fourth electrically controlled poppet valve disposed between the second accumulator and the connection with the second pressure fluid volume.

12. The remotely controlled brake system of claim 11 wherein the accumulator charging arrangement includes a first charging valve disposed between the source of pressurized fluid and the first accumulator and a second charging valve disposed between the source of pressurized fluid and the second accumulator.

13. The remotely controlled brake system of claim 12 wherein the first and second sets of brakes are pressurized applied and spring released.

14. The remotely controlled brake system of claim 13 wherein the first set of brakes is mechanical dry-brakes and the second set of brakes is fluid wet-brakes.

* * * * *